(12) United States Patent
Nakamura et al.

(10) Patent No.: US 11,680,112 B2
(45) Date of Patent: Jun. 20, 2023

(54) EXTRUSION DRYER FOR RUBBERY POLYMER, DRYING METHOD OF RUBBERY POLYMER, AND PRODUCTION METHOD OF RUBBERY POLYMER

(71) Applicant: ZEON CORPORATION, Tokyo (JP)

(72) Inventors: Masao Nakamura, Tokyo (JP); Kenichiro Sumiura, Tokyo (JP); Junichi Imai, Tokyo (JP)

(73) Assignee: ZEON CORPORATION, Tokyo (JP)

(*) Notice: Subject to any disclaimer, the term of this patent is extended or adjusted under 35 U.S.C. 154(b) by 1097 days.

(21) Appl. No.: 16/343,616

(22) PCT Filed: Oct. 23, 2017

(86) PCT No.: PCT/JP2017/038199
§ 371 (c)(1),
(2) Date: Apr. 19, 2019

(87) PCT Pub. No.: WO2018/084015
PCT Pub. Date: May 11, 2018

(65) Prior Publication Data
US 2020/0048374 A1    Feb. 13, 2020

(30) Foreign Application Priority Data
Nov. 4, 2016   (JP) .............................. JP2016-216702

(51) Int. Cl.
| | | |
|---|---|---|
| *C08C 4/00* | (2006.01) | |
| *B29B 13/06* | (2006.01) | |
| *C08F 6/26* | (2006.01) | |
| *B29K 9/00* | (2006.01) | |

(52) U.S. Cl.
CPC ................ *C08C 4/00* (2013.01); *B29B 13/06* (2013.01); *C08F 6/26* (2013.01); *B29K 2009/00* (2013.01)

(58) Field of Classification Search
CPC ... C08C 4/00; C08F 6/26; B29B 13/06; B29B 13/02; B29B 13/065; B29K 2009/00

USPC ........................................................ 526/340
See application file for complete search history.

(56) References Cited

U.S. PATENT DOCUMENTS

| | | | |
|---|---|---|---|
| 4,304,054 A | * | 12/1981 | Nauck .................. B29C 48/395 |
| | | | 241/82.5 |
| 2003/0128624 A1 | | 7/2003 | Inoue et al. |
| 2013/0203942 A1 | | 8/2013 | Paul et al. |
| 2017/0152353 A1 | | 6/2017 | Nishimura |
| 2020/0031959 A1 | * | 1/2020 | Nakamura ................ C08F 6/22 |

FOREIGN PATENT DOCUMENTS

| | | |
|---|---|---|
| EP | 1 815 959 A1 | 8/2007 |
| JP | S56-036539 A | 4/1981 |
| JP | H05-050424 A | 3/1993 |
| JP | 2003-164746 A | 6/2003 |
| JP | 2003-266435 A | 9/2003 |
| JP | 2013-522433 A | 6/2013 |
| JP | 2016-003316 A | 1/2016 |
| WO | 2006/054525 A1 | 5/2006 |

OTHER PUBLICATIONS

Aug. 21, 2020 Office Action issued in Chinese Patent Application No. 201780064172.7.
Dec. 5, 2017 Search Report issued in International Patent Application No. PCT/JP2017/038199.
Jul. 27, 2021 Office Action issued in Japanese Patent Application No. 2018-548945.

* cited by examiner

*Primary Examiner* — Hannah J Pak
(74) *Attorney, Agent, or Firm* — Oliff PLC (57) ABSTRACT

An extrusion dryer for a rubbery polymer includes a cylinder equipped with a hopper for injection of the rubbery polymer at one end and a die at the other end. A screw is rotatably arranged inside of the cylinder, the screw having a shaft and a spiral flight formed on an outer surface of the shaft. The shaft includes multiple zones, each including a conveyance section and a compression section. In the zone closest to the die, the outer diameter of the shaft at the conveyance section is smaller than the outer diameter at the compression section.

6 Claims, 3 Drawing Sheets

EXTRUSION DRYER FOR RUBBERY POLYMER, DRYING METHOD OF RUBBERY POLYMER, AND PRODUCTION METHOD OF RUBBERY POLYMER

BACKGROUND OF THE INVENTION

1. Field of the Invention

The present invention relates to an extrusion dryer for a rubbery polymer, a drying method of a rubbery polymer, and a production method of a rubbery polymer.

2. Description of the Related Art

In a process of manufacturing a rubbery polymer, an extrusion dryer is conventionally used to dry the rubbery polymer obtained after a polymerization step and a solidification step, which contains large amount of moisture (see Patent Document 1, for example).

The extrusion dryer includes a cylinder having a hopper for introducing a rubbery polymer at one end and having a die at the other end, and a screw rotatably arranged in the cylinder. The introduced rubbery polymer is conveyed to the die, while high temperature and high pressure are applied to the rubbery polymer by compression and shearing action occurring in the extrusion dryer, and is extruded to atmosphere from a nozzle of the die. At this time, because most of moisture contained in the rubbery polymer is vaporized and emitted into the atmosphere, the moisture content of the rubbery polymer is quickly reduced.

RELATED-ART DOCUMENTS

Patent Document

[Patent Document 1] WO2006/054525

SUMMARY OF THE INVENTION

Technical Problem

The temperature of the rubbery polymer and the pressure applied to the rubbery polymer before extrusion from the nozzle of the die are important factors for determining the quality of the extruded rubbery polymer. However, it is generally difficult to control the temperature and the pressure appropriately. For example, if rotational speed of the screw is increased in order to obtain sufficient pressure, unnecessary heat may be generated in the cylinder, and the rubbery polymer may degrade by the heat. In some cases, gelation of the rubbery polymer may occur. Conversely, if an operation is performed while considering degradation of a rubbery polymer caused by unnecessary heat, the rubbery polymer may not dry sufficiently.

In view of the above-described problems, one aspect of the present invention aims at providing an extrusion dryer for a rubbery polymer that can adequately dry a rubbery polymer, while also avoiding gelation of the rubbery polymer by suppressing generation of excess heat during an operation.

Solution to Problem

An extrusion dryer for a rubbery polymer according to an embodiment of the present invention includes a cylinder equipped with a hopper for introducing the rubbery polymer at one end and equipped with a die at the other end; and a screw rotatably arranged inside of the cylinder. The screw includes a shaft and a spiral flight formed on an outer surface of the shaft. The screw includes multiple zones each including a conveyance section and a compression section. In the zone closest to the die, the outer diameter of the shaft at the conveyance section is smaller than the outer diameter at the compression section.

Advantageous Effects of Invention

According to one aspect of the present invention, an extrusion dryer that can adequately dry a rubbery polymer is provided, while also avoiding gelation of the rubbery polymer by suppressing generation of excess heat.

DETAILED DESCRIPTION OF THE PREFERRED EMBODIMENTS

In the following, an embodiment of the present invention will be described. Note that the drawings are presented in order to explain the following description plainly, and the drawings are not necessarily illustrated to scale.

Figure 1:
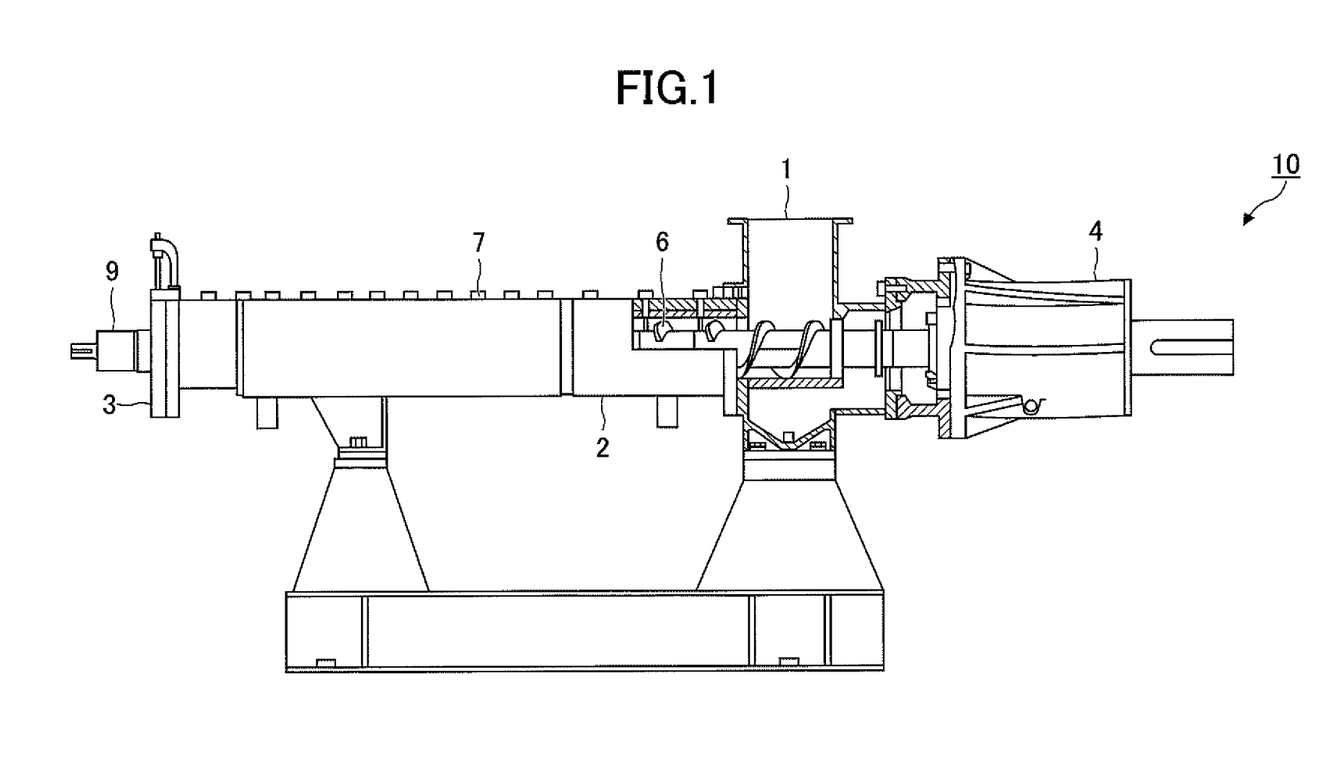
FIG. 1 is a partial cutaway of an extrusion dryer according to an embodiment.

A schematic structure of an extrusion dryer according to an embodiment of the present invention is illustrated in FIG. 1. In FIG. 1, a partial cutaway of an expansion-type extrusion dryer 10 is illustrated, as an example.

Figure 2:
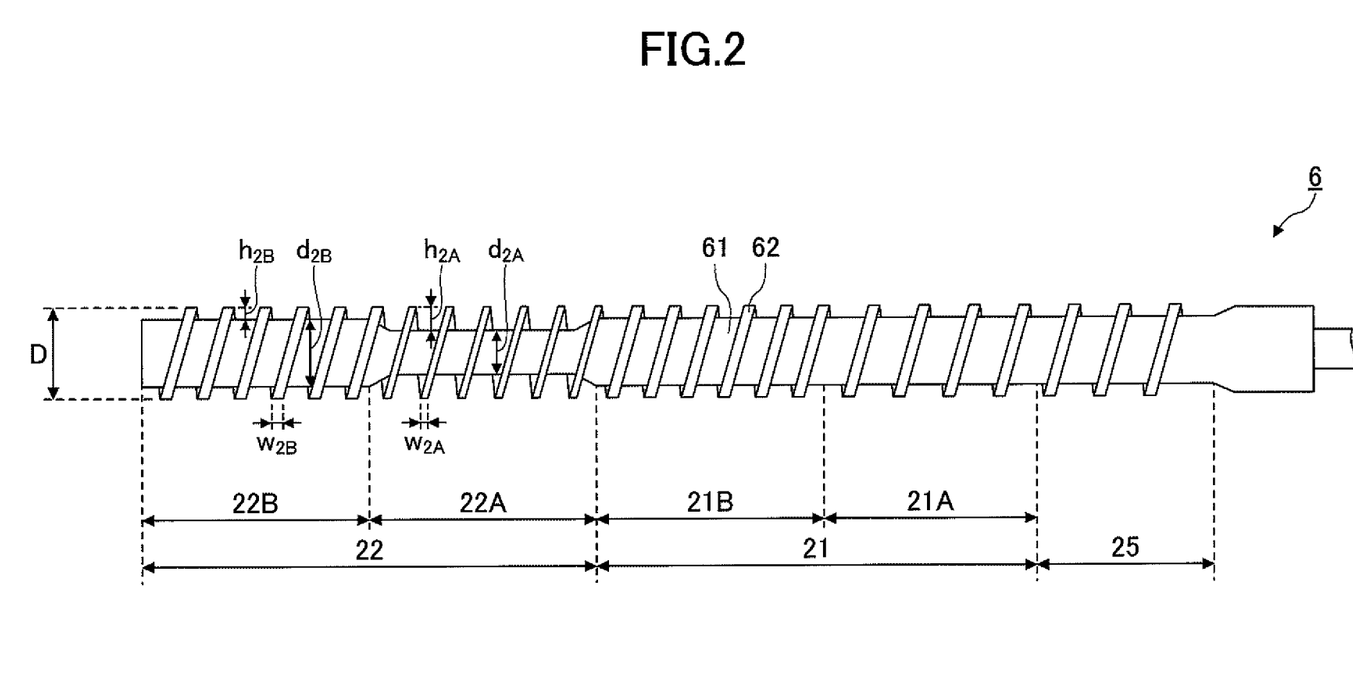
FIG. 2 is a schematic diagram of a screw for the extrusion dryer according to the embodiment.

As illustrated in FIG. 1, the extrusion dryer 10 includes a cylindrical cylinder 2 having a hopper 1 for introducing a rubbery polymer containing moisture (raw material or object to be dried) at one end and having a die 3 at the other end, and a screw (worm) 6 arranged in the cylinder 2. The rubbery polymer supplied from the hopper 1 is conveyed in the cylinder 2 toward the die 3, by rotation of the screw 6 as illustrated in FIG. 2. During the conveyance, the rubbery polymer is heated and pressed because the rubbery polymer is sheared and pressed between a liner in the cylinder 2 and a flight 62 of the screw 6, or between a breaker bolt 7 and the flight 62 of the screw 6. The rubbery polymer may be heated with a heating means provided at the cylinder 2 and/or a shaft 61 of the screw 6.

The moisture-containing rubbery polymer, to which high heat and high pressure are applied in the cylinder 2, is conveyed to the die 3, and is ejected into atmosphere from a nozzle of the die 3. At this time, as moisture or the like at high-temperature and high-pressure contained in the rubbery polymer is sharply vaporized and emitted into the atmosphere, the rubbery polymer dries (expansion drying).

The screw 6 is driven by an actuator 4, and is rotatably arranged in the cylinder 2 while having a prescribed gap between an inner surface of the cylinder 2 and the screw 6. An inner diameter of the cylinder 2 is almost constant, except within the vicinity of the die 3.

As illustrated in FIG. 2, the screw 6 includes a hollow shaft 61, and a spiral flight (blade) 62 projecting from the outer surface of the shaft 61. As notches are provided on the flight 62, the flight 62 has a discontinuous spiral structure.

Because of the structure, the flight 62 does not contact the breaker bolt 7 which is implanted on a side surface of the cylinder 2 to an inner side of the cylinder 2 in a radial direction so as to protrude inside the cylinder 2. In embodiments that do not include the breaker bolt 7, the flight 62 may have a continuous spiral structure.

The screw 6 of the extrusion dryer 10, illustrated in FIG. 2, includes two zones, a first zone 21 and a second zone 22. The first zone 21 includes a first conveyance section 21A and a first compression section 21B adjacent to the first conveyance section 21A at a side closer to the hopper 1. The second zone 22 which is the closest to the die 3 includes a second conveyance section 22A and a second compression section 22B adjacent to the second conveyance section 22A at a side closer to the hopper 1. A hopper section 25 is provided at a region adjacent to an end of the first zone 21, and closer to the hopper 1.

In the present embodiment, because the screw 6 includes the multiple zones 21 and 22 each including a conveyance section and a compression section, temperature and pressure increase gradually. Thus, because high-temperature and high-pressure areas are dispersed, variation of load applied to a compression section and a conveyance section adjacent to the die can be reduced.

A rubbery polymer containing large amount of moisture exhibits quality of a solid body. However, because uniformity of material is low, the rubbery polymer tends to generate heat locally. Also, because a rubbery polymer containing large amount of moisture has low heat conductivity, temperature distribution and pressure distribution tend to occur, the rubbery polymer cannot be conveyed stably, and surging (a phenomenon that an extrusion dryer stalls because of a backward flow and stops working) may occur. By increasing uniformity while applying temperature and pressure in the first zone, and by further increasing uniformity in the second zone, amount of conveyance, uniformity of temperature distribution, and uniformity of pressure distribution can be gradually increased, and a rubbery polymer can be expanded in a uniform state. As a result, when the rubbery polymer is extruded from the die 3 of the extrusion dryer, a uniformly dried rubbery polymer can be obtained. Repetition of increase of temperature and pressure, by providing multiple zones, may be performed twice or more. In accordance with the quality of material to be dried, 3 or more zones may be provided.

In the present embodiment, at the second zone 22, which is the closest to the die 3, the shaft outer diameter $d_{2A}$ of the shaft 61 (inner diameter of the screw 6) at the second conveyance section 22A is smaller than the shaft outer diameter $d_{2B}$ of the shaft 61 at the second compression section 22B. As an outer diameter D of the screw 6 (outer diameter of the flight 62) is constant in the extrusion dryer 10 illustrated in the drawings, and diameters of the shaft 61 in the second zone 22 are as described above, a height $h_{2A}$ of the flight 62 at the second conveyance section 22A can be higher than a height $h_{2B}$ of the flight 62 at the second compression section 22B. Note that a height h of the flight (flight height) of the screw 6 corresponds to a difference obtained by subtracting an outer radius d/2 of the shaft 61 from an outer radius D/2 of the screw 6 (outer radius of the flight 62).

Amount of heat generated by conveyance of a rubbery polymer in the cylinder 2 is proportional to a square of shear rate. Shear rate is proportional to velocity in a direction of shear stress applied to a rubbery polymer, which is rotational speed (of the screw 6), and shear rate is in inversely proportional to a height of a flight (flight height) h. Thus, if the flight height h is increased, shear rate decreases, and heat to be generated also decreases. Therefore, as described above, if the shaft outer diameter $d_{2A}$ at the second conveyance section 22A is smaller than the shaft outer diameter $d_{2B}$ at the second compression section 22B, heat to be generated (heat that is inevitably generated) can be decreased. As a result, excessive temperature increase of a rubbery polymer can be prevented, and deterioration (gelation) can be suppressed.

Further, in the second zone 22, by making the shaft outer diameter $d_{2A}$ at the second conveyance section 22A smaller than the shaft outer diameter $d_{2B}$ at the second compression section 22B, a capacity of the second conveyance section 22A (volume of material that can be accommodated in the second conveyance section 22A) increases, and conveyed volume $V_{2A}$ increases. As a result, at the second zone 22, a ratio of the conveyed volume $V_{2A}$ at the second conveyance section 22A to conveyed volume $V_{2B}$ at the second compression section 22B (conveyed volume ratio or compression ratio ($V_{2A}/V_{2B}$)) can be increased. That is, a degree of compression of a rubbery polymer at the second compression section 22B can be increased. Accordingly, because pressure of a rubbery polymer after passing through the compression section can be increased, the moisture evaporation rate when a rubbery polymer is extruded can also be increased, and drying can be encouraged. For example, if a rubbery polymer having moisture content of approximately 40% by mass is dried by extrusion, the moisture content of the rubbery polymer becomes 10% by mass or less.

As described above, according to the present embodiment, degradation of a rubbery polymer can be reduced because excessive temperature increase can be suppressed, and pressure necessary for drying can also be secured. Thus, a rubbery polymer of high quality can be stably produced.

Also, in the present embodiment, because the extrusion dryer 10 is configured to have the above-described relation ($d_{2A} < d_{2B}$) at a zone closest to the die 3, the extrusion dryer 10 can appropriately control temperature and pressure of a rubbery polymer at a point just before the rubbery polymer is extruded (or temperature and pressure at an outlet of a rubbery polymer), which are especially important factors for production of a rubbery polymer.

Further, in the extrusion dryer 10 according to the present embodiment, because generation of unnecessary heat can be suppressed, the rotational speed N of the screw 6 can be increased for example, as compared to conventional extrusion dryers. Accordingly, because the amount of a dried rubbery polymer obtained per unit time can be increased, productivity is improved.

In the second zone 22, the pitch of the flight 62 of the screw 6 is substantially constant, as illustrated in FIG. 2. That is, in the second zone 22, conveyed volume ratio ($V_{2A}/V_{2B}$) is increased not by changing pitch of the flight 62 between the second conveyance section 22A and the second compression section 22B, but by changing the outer diameter d of the shaft 61 between the second conveyance section 22A and the second compression section 22B.

If the pitch of the flight 62 at the second conveyance section 22A is greater than the pitch of the flight 62 at the second compression section 22B, the conveyed volume ratio ($V_{2A}/V_{2B}$) in the second zone 22 increases. However, because the shear rate increases, the amount of heat generated increases. Thus, temperature of a rubbery polymer at a point just before the rubbery polymer is extruded may excessively increase, and temperature cannot be controlled appropriately.

However, if, by configuring the shaft outer diameter $d_{2A}$ at the second conveyance section 22A to be smaller than the shaft outer diameter $d_{2B}$ at the second compression section 22B, unnecessary heat generation is suppressed, the pitch of the flight 62 at the second conveyance section 22A may differ from the pitch of the flight 62 at the second compression section 22B.

It is preferable that the shaft outer diameter $d_{2A}$ at the second conveyance section 22A in the second zone 22 remain constant throughout the entirety of the second conveyance section 22A, from an end portion at a side closer to the hopper 1 to the other end portion at a side of the die 3. However, as illustrated in FIG. 2, the shaft 61 may be designed such that a reverse taper is formed on the shaft 61 at both ends of the second conveyance section 22A. In this case, the shaft outer diameter $d_{2A}$ may be a shaft outer diameter of a middle portion between an end portion of the second conveyance section 22A at a side closer to the hopper 1 and the other end portion at a side of the die 3, in which a shaft diameter is substantially constant.

Also, in the second conveyance section 22A of the second zone 22, the conveyed volume $V_{2A}$ may be the conveyed volume of a middle portion of the second conveyance section 22A between an end portion of the screw 6 at a side closer to the hopper 1 and the other end portion at a side of the die 3, in which a shaft outer diameter is substantially constant.

In the present embodiment, a ratio of the shaft outer diameter $d_{2B}$ at the second compression section 22B to the shaft outer diameter $d_{2A}$ at the second conveyance section 22A is preferably between 1:0.8 and 1:0.98, and more preferably between 1:0.85 and 1:0.96. If the ratio is 1:0.98 or lower, high conveyed volume ratio ($V_{2A}/V_{2B}$) at the second zone 22 can be attained and effect for securing pressure for drying can be enhanced, while suppressing generation of unnecessary heat in the dryer and avoiding excessive temperature increase. Thus, deterioration (gelation) of a rubbery polymer can be avoided, and a higher drying efficiency can be attained. In addition, if the ratio is 1:0.8 or larger, strength of the shaft 61 sufficient for an extrusion operation of a rubbery polymer can be secured.

At the second zone, which is the closest to the die 3, a width (thickness) $w_{2A}$ of the flight 62 (flight width) at the second conveyance section 22A is preferably smaller than a width $w_{2B}$ of the flight 62 at the second compression section 22B. This is because the volume in the second conveyance section 22A (volume of material that can be accommodated in the second conveyance section 22A) can be increased, and the conveyed volume ratio ($V_{2A}/V_{2B}$) at the second zone 22 can be increased. Thus, in a case in which the flight width $w_{2A}$ at the second conveyance section 22A is configured to be smaller than the width $w_{2B}$ of the flight 62 at the second compression section 22B, from the perspective of increasing the conveyed volume ratio ($V_{2A}/V_{2B}$), the shaft outer diameter $d_{2A}$ at the second conveyance section 22A does not need to be reduced by an increment of the conveyed volume ratio corresponding to reduction of the flight width $w_{2A}$. That is, the conveyed volume ratio ($V_{2A}/V_{2B}$) may be increased while maintaining strength of the shaft 61 of the screw 6.

A ratio of the flight width $w_{2B}$ at the second compression section 22B to the flight width $w_{2A}$ at the second conveyance section 22A is, although it depends on sizes of the extrusion dryer 10 and the screw 6, preferably between 1:0.4 and 1:0.8, and more preferably between 1:0.45 and 1:0.6. If the ratio is 1:0.8 or lower, the conveyed volume ratio can be increased, and pressure of a rubbery polymer that is just before extruded can be increased. Further, if the ratio is 1:0.4 or larger, strength of the shaft 61 of the screw 6 and strength of the flight 62 itself can be secured.

Even if $w_{2A}$ is configured to be smaller than $w_{2B}$, because the pressure applied from a rubbery polymer to the flight 62 at the second conveyance section 22A is smaller than the pressure applied to the flight 62 at the second compression section 22B. Thus, there is little influence on the flight 62 from perspective of the strength of the flight 62.

Also, in the present embodiment, at the second zone 22, which is the closest to the die, a ratio of volume $V_{2B}$ of a rubbery polymer conveyed at the second compression section 22B in a single revolution of the screw to volume $V_{2A}$ of a rubbery polymer conveyed at the second conveyance section 22A in a single revolution of the screw is preferably 1: (larger than 1). For example, the ratio is preferably between 1:1.1 and 1:5, more preferably between 1:1.5 and 1:2.5, much more preferably between 1:1.6 and 1:2.2, and yet much more preferably between 1:1.8 and 1:2.0. If the ratio is 1:1.1 or larger, the pressure applied to the rubbery polymer that is just before extruded can be increased. As a result, evaporation of moisture in the extruded rubbery polymer is enhanced, and a rubbery polymer having high quality and low moisture content can be obtained. Further, if the ratio is 1:5 or lower, the mechanical strength of the extrusion dryer can be secured.

In FIG. 2, a structure of the first zone 21 differs from that of the second zone 22. That is, in the first zone 21, a shaft outer diameter at the first conveyance section 21A is equal to a shaft outer diameter at a first compression section 21B. Pitch of the flight 62 at the first conveyance section 21A is greater than pitch of the flight 62 at the first compression section 21B, and a width of the flight 62 is the same in the first conveyance section 21A and the first compression section 21B. In an example of the first zone 21 illustrated in the drawing, the conveyed volume ratio is configured to be larger than 1 by changing pitch of the flight 62 between the conveyance section and the compression section.

However, the structure of the first zone 21 is not limited to the above-described structure. The first zone 21 may have the same structure as the second zone 22. For example, the shaft outer diameter at the first conveyance section 21A may be smaller than the shaft outer diameter at the first compression section 21B. By adopting this configuration, effect for sufficiently encouraging drying of a rubbery polymer while suppressing unnecessary heat generation, which is similar to that obtained at the second zone 22, can be obtained in the first zone 21. As a result, a rubbery polymer of further higher quality can be obtained.

In this case, in the first zone 21, similar to the second zone 22, a ratio of the shaft outer diameter at the first compression section 21B to the shaft outer diameter at the first conveyance section 21A is preferably between 1:0.8 and 1:0.98, and more preferably between 1:0.85 and 1:0.96.

Also, in the first zone 21, a ratio of volume of a rubbery polymer conveyed at the first compression section 21B in a single revolution of the screw to volume of a rubbery polymer conveyed at the first conveyance section 21A in a single revolution of the screw can be made to 1:1 or larger. The ratio is preferably between 1:1.5 and 1:2.5, more preferably between 1:1.6 and 1:2.2, and much more preferably between 1:1.8 and 1:2.0.

Further, a flight width at the first conveyance section 21A may be smaller than a flight width at the first compression section 21B. A ratio of these flight widths is preferably between 1:0.4 and 1:0.8, and more preferably between 1:0.45 and 1:0.6.

In the embodiment illustrated in FIG. 2, two zones, each of which is composed of the conveyance section and the compression section, are provided. However, the number of such a zone provided in the extrusion dryer 10 may be more than two. In this case, multiple first zones 21 may be provided at locations closer to an inlet side relative to the second zone 22 positioned closest to the die 3. In such a case, for each of the multiple first zones 21, if a shaft outer diameter at the first conveyance section 21A is configured to be smaller than a shaft outer diameter at the first compression section 21B as described above, unnecessary heat generation can be suppressed. Also, in this configuration, because the conveyed volume ratio can be increased for each of the multiple first zones 21, the pressure of a rubbery polymer just before extruded can be maintained sufficiently high.

Note that the cylinder 2 and the screw 6 that are used in the above-described embodiment are configured such that inner and outer diameters of the cylinder 2 and an outer diameter of the screw 6 are constant in an axial direction. However, these diameters are not required to be constant. Even in a case in which at least one of these diameters varies in the axial direction, by making the shaft outer diameter $d_{2A}$ at the second conveyance section 22A smaller than the shaft outer diameter $d_{2B}$ at the second compression section 22B, or by making the flight height $h_{2A}$ at the second conveyance section 22A higher than the flight height $h_{2B}$ at the second compression section 22B, an effect of the present invention capable of performing excellent drying while suppressing heat generation in the extrusion dryer 10, can be attained.

The types of a rubbery polymer that may be dried by extrusion according to the present embodiment are not limited to any specific types. Examples of the rubbery polymer to be dried by extrusion according to the present embodiment include: diene rubbers, such as butadiene rubber (BR), styrene-butadiene rubber (SBR), isoprene rubber (IR), styrene-isoprene block copolymers (SIS), styrene-butadiene block copolymers (SBS), nitrile butadiene rubber (NBR), and chloroprene rubber (CR); olefin-based rubbers, such as butyl rubber (IIR), ethylene-propylene-diene terpolymer rubber (EPDM), acrylic rubber, chlorosulfonated polyethylene rubber, and fluororubber; silicone rubber; and urethane rubber. The present embodiment is preferably used for drying BR or SBR, among these rubbery polymers.

In the present embodiment, a method of drying a rubbery polymer is provided, in which the above-described extrusion dryer 10 is used. The present embodiment also provides a method of producing a rubbery polymer, in which the above-described extrusion dryer 10 is used.

Figure 3:
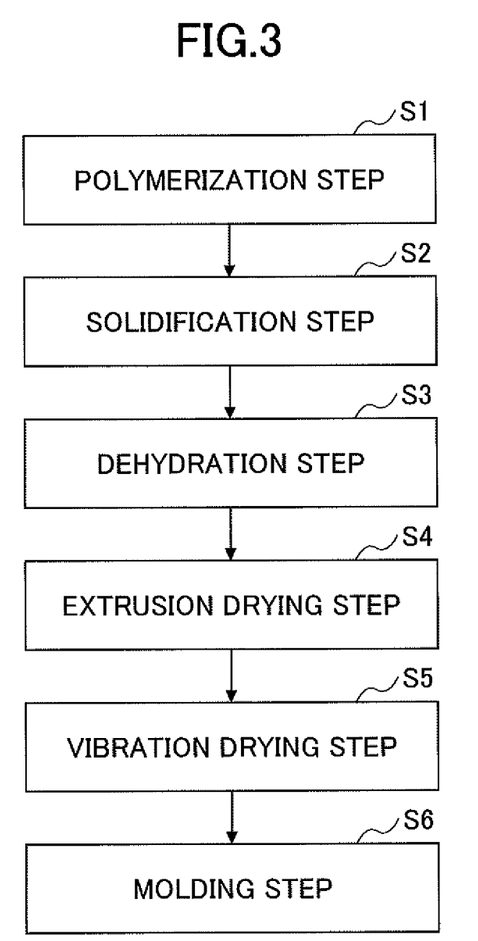
FIG. 3 is a flowchart illustrating an example of a production method of a rubbery polymer according to the embodiment.

FIG. 3 is a flowchart illustrating an example of the method of producing a rubbery polymer according to the present embodiment. As illustrated in FIG. 3, the method of producing a rubbery polymer according to the present embodiment includes a polymerization step S1, a solidification step S2, a dehydration step S3, an extrusion drying step S4, a vibration drying step S5, and a molding step S6.

In the polymerization step S1, rubber raw material such as butadiene is polymerized by a polymerization reaction such as emulsion polymerization and solution polymerization, and latex, solution, or the like, of a rubbery polymer is obtained. In the solidification step S2, a slurry of the rubbery polymer is prepared by applying a steam stripping method to the solution or the latex of the rubbery polymer, for desolventization, or by salt coagulation. In the dehydration step S3, the slurry of the rubbery polymer is dehydrated by using a dehydrator such as an extruder-type squeezer, to obtain crumbs of predetermined moisture content.

In the extrusion drying step S4, the dehydrated crumb of the rubbery polymer is dried by extrusion, by using the above-described extrusion dryer 10. In the vibration drying step S5, the rubbery polymer to which the above-described extrusion drying step S4 has been applied is placed on a moving vibration belt, and the rubbery polymer is heated to dry while applying vibration. The rubbery polymer can be heated by causing the rubbery polymer to directly touch hot air, or by causing the rubbery polymer to indirectly touch heating medium.

In the molding step S6, the mass of the rubbery polymer to which the vibration drying step S5 has been applied is measured, and the rubbery polymer is formed into a bale of predetermined dimensions, by using a molding machine. The bale can be formed in a rectangular parallelepiped shape having a short side of 36 cm, a long side of 73 cm, and a height of 18 cm.

According to the drying method or the production method of a rubbery polymer in the present embodiment, by suppressing unnecessary heat generation in the drying step, the rubbery polymer can be uniformly dried. Accordingly, heat loss can be reduced. The heat loss is determined by sampling the obtained rubbery polymer, drying the sampled rubbery polymer by a blower type dryer or the like, measuring the mass of the sampled rubbery polymer before and after drying, and calculating the heat loss using the following equation {[(mass of rubbery polymer before drying)−(mass of rubbery polymer after drying)]/(mass of rubbery polymer before drying)}×100.

Also, according to the present embodiment, because high pressure can be secured at an outlet and the moisture evaporation rate from a rubbery polymer can be increased without degrading the rubbery polymer, a rubbery polymer of high quality can be obtained. Further, because an operation at higher rotational speed N becomes possible, productivity improves.

EXAMPLES

[Drying/Production of Butadiene Rubber (BR)]

Example 1

As the extrusion dryer 10, an expansion-type extrusion dryer (liner inner diameter: 355 mm, rotational speed: 60 to 300 rpm, internal pressure: 0.01 to 6 MPaG) was used. The screw 6 of the extrusion dryer 10 used in Example 1 was as illustrated in FIG. 2, and an outer diameter of the screw was 352 mm.

A shaft outer diameter (flight inner diameter) of the screw 6 was set to 257 mm at the second conveyance section 22A, and set to 273 mm at the other sections (hopper section 25, first conveyance section 21A, first compression section 21B, and second compression section 22B). A flight width of the screw 6 was set to 15 mm at the second conveyance section 22A, and set to 31 mm at the other sections (hopper section 25, first conveyance section 21A, first compression section 21B, and second compression section 22B).

The volume of a rubbery polymer conveyed in a single revolution of the screw was 5293 cm$^3$ at the hopper section 25, 2300 cm$^3$ at the first conveyance section 21A, 987 cm$^3$ at the first compression section 21B, 1584 cm$^3$ at the second conveyance section 22A, and 987 cm$^3$ at the second compression section 22B.

As the rubbery polymer used in Example 1, butadiene rubber crumbs were prepared by performing the following process. From butadiene rubber (BR) produced by solution polymerization, solvent was removed by a steam stripping method, and the coagulated rubbery polymer was collected. From the coagulated rubbery polymer, butadiene rubber crumbs were prepared by performing dehydration using a dehydrator. The moisture content of the butadiene rubber (BR) after dehydration by the dehydrator was 12%.

In Example 1, extrusion drying of the above-described rubbery polymer was performed while the above-described extrusion dryer 10 was controlled such that a die temperature was maintained at approximately 150° C.

The moisture content of the butadiene rubber (BR) after the extrusion drying step was 4.8%. Also, in Example 1, average shaft rotational speed N (rpm) during operation and average collected amount Q (kg/h) during operation were recorded.

After the extrusion drying step, the vibration drying step and the molding step were performed, to obtain a bale (approximately 36 cm short side×73 cm long side×18 cm height). Dry evaluation of this bale of the rubbery polymer was performed visually. The dry evaluation was performed by visually counting the number of white portions having a diameter of 10 mm or larger, which appeared on a surface of the bale obtained during production of one hour. If a rubbery polymer was dried sufficiently, the color of the bale is uniformly yellow. However, if moisture remains in a part of a rubbery polymer, the part is observed as a white portion. Thus, if the number of white portions on the bale is small, it means that the rubbery polymer has been sufficiently dried. Conversely, if the number of the white portions is large, it means that the rubbery polymer has not been sufficiently dried.

Further, with respect to the rubbery polymer (bale) sampled after the molding step, moisture content was measured by a blower type dryer (105° C., 1 hour), and heat loss (%) was calculated. The heat loss is calculated by the expression {[(mass of sample obtained after molding step)−(mass of sample having been dried by blower type dryer)]/(mass of sample obtained after molding step)}×100.

Conditions and results of the extrusion drying will be illustrated in Table 1 and Table 2.

TABLE 1

| No. | Rubber type | Shaft outer diameter | | | | | |
|---|---|---|---|---|---|---|---|
| | | 2nd zone | | | 1st zone | | |
| | | 2nd compression section $d_{2B}$ (mm) | 2nd conveyance section $d_{2A}$ (mm) | Outer diameter ratio $d_{2A}/d_{2B}$ | 1st compression section $d_{1B}$ (mm) | 1st conveyance section $d_{1A}$ (mm) | Outer diameter ratio $d_{1A}/d_{1B}$ |
| Example 1 | BR | 273 | 257 | 0.94 | 273 | 273 | 1 |
| Example 2 | | 273 | 244 | 0.89 | 273 | 273 | 1 |
| Comparative Example 1 | | 273 | 273 | 1 | 273 | 273 | 1 |
| Comparative Example 2 | | 273 | 273 | 1 | 273 | 273 | 1 |
| Example 3 | SBR | 273 | 257 | 0.94 | 273 | 273 | 1 |
| Example 4 | | 273 | 244 | 0.89 | 273 | 273 | 1 |
| Comparative Example 3 | | 273 | 273 | 1 | 273 | 273 | 1 |
| Comparative Example 4 | | 273 | 273 | 1 | 273 | 273 | 1 |

| No. | Conveyed volume | | | | | |
|---|---|---|---|---|---|---|
| | 2nd zone | | | 1st zone | | |
| | 2nd compression section $V_{2B}$ (cm$^3$) | 2nd conveyance section $V_{2A}$ (cm$^3$) | Conveyed volume ratio $V_{2A}/V_{2B}$ | 1st compression section $V_{1B}$ (cm$^3$) | 1st conveyance section $V_{1A}$ (cm$^3$) | Conveyed volume ratio $V_{1A}/V_{1B}$ |
| Example 1 | 987 | 1584 | 1.60 | 987 | 2300 | 2.33 |
| Example 2 | 987 | 1809 | 1.83 | 987 | 2300 | 2.33 |
| Comparative Example 1 | 987 | 980 | 0.99 | 987 | 2300 | 2.33 |
| Comparative Example 2 | 987 | 980 | 0.99 | 987 | 980 | 0.99 |
| Example 3 | 987 | 1584 | 1.60 | 987 | 2300 | 2.33 |
| Example 4 | 987 | 1809 | 1.83 | 987 | 2300 | 2.33 |
| Comparative Example 3 | 987 | 980 | 0.99 | 987 | 2300 | 2.33 |
| Comparative Example 4 | 987 | 980 | 0.99 | 987 | 980 | 0.99 |

TABLE 2

| No. | Rubber type | Number of white portions *1 | Support of Die Temperature *2 | Heat Loss *3 | Collected amount Q (kg/h) | Rotational speed N (rpm) |
|---|---|---|---|---|---|---|
| Example 1 | BR | 6 | Y | 0.50% | 4200 | 130 |
| Example 2 | | 2 | Y | 0.30% | 4500 | 140 |
| Comparative Example 1 | | 63 | Y | 1.0% | 4000 | 120 |
| Comparative Example 2 | | Gelation | N | — | 2500 | 160 |
| Example 3 | SBR | 3 | Y | 0.40% | 5700 | 220 |
| Example 4 | | 1 | Y | 0.20% | 6000 | 270 |
| Comparative Example 3 | | 53 | Y | 0.90% | 5500 | 200 |
| Comparative Example 4 | | Gelation | N | — | 3000 | 270 |

*1 The number of white portions having a diameter of 10 mm or more, which has appeared on a surface of bale obtained during production of one hour
*2 Y: Die temperature could be controlled N: Die temperature could not be controlled
*3 Obtained by drying part of bale sampled after molding step by blower type dryer (105° C. 1 hour), In Example 2, production and evaluations of a rubbery polymer similar to Example 1 were made by changing the shaft outer diameter $d_{2A}$ of the screw 6 at the second conveyance section 22A to 244 mm, and by changing the volume $V_{2A}$ of a rubbery polymer conveyed in a single revolution of the screw at the second conveyance section 22A to 1809 cm³. Other conditions in Example 2 were the same as those in Example 1.

Comparative Example 1

In Comparative Example 1, production and evaluations of a rubbery polymer similar to Example 1 were made by changing the shaft outer diameter $d_{2A}$ of the screw 6 at the second conveyance section 22A to 273 mm, by changing the flight width $w_{2A}$ at the second conveyance section 22A to 31 mm, and by changing the volume $V_{2A}$ of a rubbery polymer conveyed in a single revolution of the screw at the second conveyance section 22A to 980 cm³. Other conditions in Comparative Example 1 were the same as those in Example 1.

Note that, in Comparative Example 1, the shaft outer diameter and the flight width are constant throughout the screw (hopper section 25, first conveyance section 21A, first compression section 21B, second conveyance section 22A, and second compression section 22B).

Comparative Example 2

In Comparative Example 2, production and evaluations of a rubbery polymer similar to Example 1 were made by changing the shaft outer diameter $d_{2A}$ of the screw 6 at the second conveyance section 22A to 273 mm, by changing the flight width $w_{2A}$ at the second conveyance section 22A to 31 mm, by changing the volume $V_{2A}$ of a rubbery polymer conveyed in a single revolution of the screw at the second conveyance section 22A to 980 cm³, and by changing the pitch of the flight at the first conveyance section 21A to set conveyed volume $V_{1A}$ at the first conveyance section 21A to 980 cm³. Other conditions in Comparative Example 2 were the same as those in Example 1.

Note that, also in Comparative Example 2, the shaft outer diameter and the flight width are constant throughout the screw (hopper section 25, first conveyance section 21A, first compression section 21B, second conveyance section 22A, and second compression section 22B). Further, in Comparative Example 2, the conveyed volume ratio in the first zone 21 is equal to the conveyed volume ratio in the second zone 22.

According to Tables 1 and 2, it is found that, in Example 1 and Example 2, in which the shaft outer diameter $d_{2A}$ at the second conveyance section 22A is configured to be smaller than the shaft outer diameter $d_{2B}$ at the second compression section 22B, the number of white portions observed on the obtained rubbery polymer is smaller than that in Comparative Example 1. It is also found that, in Example 1 and Example 2, heat loss is low and high quality rubbery polymer that is uniformly and sufficiently dried can be obtained.

Further, in Example 1 and Example 2, the rotational speed N is higher than that in Comparative Example 1. Also, because the collected amount Q is also high in Example 1 and Example 2, it is found that productivity improves. This suggests that, in Example 1 and Example 2, high quality rubbery polymer was able to be obtained even when production was performed under high rotational speed N, because abnormal heat generation could be suppressed.

In contrast, in Comparative Example 1 and Comparative Example 2, in which a shaft outer diameter at the second conveyance section 22A is equal to a shaft outer diameter at the second compression section 22B, a rubbery polymer of higher quality could not be obtained, as compared with Example 1 or Example 2. That is, in Comparative Example 1, although the die temperature could be controlled appropriately, the number of white portions observed on the obtained rubbery polymer is large, and heat loss is large. Accordingly, it is found that moisture in the obtained rubbery polymer in Comparative Example 1 is higher than that in Example 1 or Example 2. In Comparative Example 2, a die temperature at 150° C. could not be maintained, degradation of a rubbery polymer occurred, and gelation was observed. Note that, in Comparative Example 2, because of the gelation, subsequent steps could not be performed. Therefore, calculation of heat loss is not performed.

[Drying/Production of Styrene-Butadiene Rubber (SBR)]

Example 3

As a rubbery polymer used in Example 3, styrene-butadiene rubber (SBR) produced by solution polymerization was used. Also, in Example 3, the extrusion dryer 10 was controlled such that a die temperature was maintained at approximately 160° C. Other conditions for production in Example 3 were the same as those in Example 1, and the same evaluations as that in Example 1 were performed in Example 3.

The moisture content of the styrene-butadiene rubber (SBR) after dehydration by the dehydrator was approximately 16%. Also, the moisture content of the styrene-butadiene rubber (SBR) after the extrusion drying step was 5.2%.

Example 4

In Example 4, production and evaluations of a rubbery polymer similar to Example 3 were made by changing the shaft outer diameter $d_{2A}$ of the screw 6 at the second conveyance section 22A to 244 mm, and by setting the volume $V_{2A}$ of a rubbery polymer conveyed in a single revolution of the screw at the second conveyance section 22A to 1809 cm$^3$. Other conditions in Example 4 were the same as those in Example 3.

Comparative Example 3

In Comparative Example 3, production and evaluations of a rubbery polymer similar to Example 3 were made by changing the shaft outer diameter $d_{2A}$ of the screw 6 at the second conveyance section 22A to 273 mm, by changing the flight width $w_{2A}$ at the second conveyance section 22A to 31 mm, and by changing the volume $V_{2A}$ of a rubbery polymer conveyed in a single revolution of the screw at the second conveyance section 22A to 980 cm$^3$. Other conditions in Comparative Example 3 were the same as those in Example 3.

Note that, in Comparative Example 3, a shaft outer diameter and a flight width are constant throughout the screw (hopper section 25, first conveyance section 21A, first compression section 21B, second conveyance section 22A, and second compression section 22B).

Comparative Example 4

In Comparative Example 4, production and evaluations of a rubbery polymer similar to Example 3 were made by changing the shaft outer diameter $d_{2A}$ of the screw 6 at the second conveyance section 22A to 273 mm, by changing the flight width $w_{2A}$ at the second conveyance section 22A into 31 mm, by changing the volume $V_{2A}$ of a rubbery polymer conveyed in a single revolution of the screw at the second conveyance section 22A to 980 cm$^3$, and by changing the pitch of the flight at the first conveyance section 21A to set conveyed volume $V_{1A}$ at the first conveyance section 21A to 980 cm$^3$. Other conditions in Comparative Example 4 were the same as those in Example 3.

Note that, also in Comparative Example 4, a shaft outer diameter and a flight width are constant throughout the screw (hopper section 25, first conveyance section 21A, first compression section 21B, second conveyance section 22A, and second compression section 22B). Further, in Comparative Example 4, conveyed volume ratio in the first zone 21 is equal to conveyed volume ratio in the second zone 22.

According to Tables 1 and 2, it is found that, in Example 3 and Example 4, in which the shaft outer diameter $d_{2A}$ at the second conveyance section 22A is configured to be smaller than the shaft outer diameter $d_{2B}$ at the second compression section 22B, the number of white portions observed on the obtained rubbery polymer is smaller than that in Comparative Example 3. It is also found that, in Example 3 and Example 4, heat loss is low and high quality rubbery polymer that is uniformly and sufficiently dried can be obtained.

Further, in Example 3 and Example 4, the rotational speed N is higher than that in Comparative Example 3. Also, because the collected amount Q is also high in Example 3 and Example 4, it is found that productivity improves. This suggests that, in Example 3 and Example 4, high quality rubbery polymer could be obtained even when production was performed under high rotational speed N, because abnormal heat generation could be suppressed.

On the other hand, in Comparative Example 3 and Comparative Example 4, in which a shaft outer diameter at the second conveyance section 22A is equal to a shaft outer diameter at the second compression section 22B, a rubbery polymer of higher quality could not be obtained, as compared with Example 3 or Example 4. That is, in Comparative Example 3, although the die temperature could be controlled appropriately, the number of white portions observed on the obtained rubbery polymer is large, and heat loss is large. Accordingly, it is found that moisture in the obtained rubbery polymer in Comparative Example 3 is larger than that in Example 3 or Example 4. In Comparative Example 4, a die temperature of 160° C. could not be maintained, degradation of the rubbery polymer occurred, and gelation was observed. Note that, in Comparative Example 4, because of the gelation, subsequent steps were not able to be performed. Therefore, calculation of heat loss is not performed.

The present application is based on and claims the benefit of priority to Japanese Patent Applications No. 2016-216702 filed on Nov. 4, 2016, the entire contents of which are hereby incorporated by reference.

DESCRIPTION OF THE REFERENCE NUMERALS

1 hopper
2 cylinder
3 die
4 actuator
6 screw
7 breaker bolt
9 cutter
10 extrusion dryer
61 shaft
62 flight
21 first zone
21A first conveyance section
21B first compression section
22 second zone
22A second conveyance section
22B second compression section
25 hopper section
D flight outer diameter (screw outer diameter)
d shaft outer diameter (screw inner diameter)
h flight height
w flight width

What is claimed is:
1. An extrusion dryer for a rubbery polymer, comprising:
a cylinder equipped with a hopper for injection of the rubbery polymer at one end and equipped with a die at another end; and
a screw rotatably arranged inside the cylinder, the screw including a shaft and a spiral flight formed on an outer surface of the shaft; wherein a plurality of zones each composed of a conveyance section and a compression section are provided on the screw, and, in a zone of the plurality of zones closest to the die, an outer diameter of the shaft at the conveyance section is smaller than an outer diameter at the compression section, and wherein in the zone closest to the die, a ratio of the outer diameter of the shaft at the compression section to the outer diameter of the shaft at the conveyance section is between 1:0.8 and 1:0.98.

2. An extrusion dryer for a rubbery polymer, comprising:
a cylinder equipped with a hopper for injection of the rubbery polymer at one end and equipped with a die at another end; and
a screw rotatably arranged inside the cylinder, the screw including a shaft and a spiral flight formed on an outer surface of the shaft; wherein
a plurality of zones each composed of a conveyance section and a compression section are provided on the screw, and,
in a zone of the plurality of zones closest to the die, an outer diameter of the shaft at the conveyance section is smaller than an outer diameter at the compression section, and wherein in the zone closest to the die, a ratio of volume of the rubbery polymer conveyed at the compression section in a single revolution of the screw to volume of the rubbery polymer conveyed at the conveyance section in a single revolution of the screw is 1:1.5 or larger.

3. The extrusion dryer according to claim 1, wherein, in the zone closest to the die, a width of the flight at the conveyance section is smaller than a width of the flight at the compression section.

4. A method of drying a rubbery polymer, the method comprising:
drying the rubbery polymer using an extrusion dryer, the extrusion dryer including
a cylinder equipped with a hopper for injection of the rubbery polymer at one end and equipped with a die at another end; and
a screw rotatably arranged inside the cylinder, the screw including a shaft and a spiral flight formed on an outer surface of the shaft; wherein
a plurality of zones each composed of a conveyance section and a compression section are provided on the screw, and,
in a zone of the plurality of zones closest to the die, an outer diameter of the shaft at the conveyance section is smaller than an outer diameter at the compression section, and wherein in the zone closest to the die, a ratio of the outer diameter of the shaft at the compression section to the outer diameter of the shaft at the conveyance section is between 1:0.8 and 1:0.98.

5. A method of producing a rubbery polymer, the method comprising:
preparing slurry of a rubbery polymer by coagulating solution or latex of the rubbery polymer;
dehydrating the slurry to form a dehydrated rubbery polymer; and
drying the dehydrated rubbery polymer by extrusion, the drying step including drying the dehydrated rubbery polymer using an extrusion dryer including
a cylinder equipped with a hopper for injection of the rubbery polymer at one end and equipped with a die at another end; and
a screw rotatably arranged inside the cylinder, the screw including a shaft and a spiral flight formed on an outer surface of the shaft; wherein
a plurality of zones each composed of a conveyance section and a compression section are provided on the screw, and,
in a zone of the plurality of zones closest to the die, an outer diameter of the shaft at the conveyance section is smaller than an outer diameter at the compression section and wherein in the zone closest to the die, a ratio of the outer diameter of the shaft at the compression section to the outer diameter of the shaft at the conveyance section is between 1:0.8 and 1:0.98.

6. The extrusion dryer according to claim 2, wherein, in the zone closest to the die, a ratio of the outer diameter of the shaft at the compression section to the outer diameter of the shaft at the conveyance section is between 1:0.8 and 1:0.98, and a width of the flight at the conveyance section is smaller than a width of the flight at the compression section.

* * * * *